US012673711B2

(12) United States Patent
Matsumoto et al.

(10) Patent No.: US 12,673,711 B2
(45) Date of Patent: Jul. 7, 2026

(54) WHEELED PLATFORM FOR EXTERNAL CHARGER AND METHOD FOR TRANSPORTING EXTERNAL CHARGER

(71) Applicant: TAKEUCHI MFG. CO., LTD., Hanishina-gun (JP)

(72) Inventors: Tetsuya Matsumoto, Hanishina-gun (JP); Kengo Kumeuchi, Hanishina-gun (JP)

(73) Assignee: TAKEUCHI MFG. CO., LTD., Hanishina-gun (JP)

( * ) Notice: Subject to any disclaimer, the term of this patent is extended or adjusted under 35 U.S.C. 154(b) by 285 days.

(21) Appl. No.: 18/223,103

(22) Filed: Jul. 18, 2023

(65) Prior Publication Data

US 2024/0286661 A1 Aug. 29, 2024

(30) Foreign Application Priority Data

Feb. 27, 2023 (JP) ................................. 2023-027877

(51) Int. Cl.
*B62B 5/00* (2006.01)
*B60L 53/30* (2019.01)
*B62B 5/04* (2006.01)

(52) U.S. Cl.
CPC ............ *B62B 5/0003* (2013.01); *B60L 53/30* (2019.02); *B62B 5/04* (2013.01); *B60L 2200/40* (2013.01)

(58) Field of Classification Search
CPC ......... B62B 5/0003; B62B 5/04; B60L 53/30; B60L 2200/40
USPC ................................................. 280/727, 762
See application file for complete search history.

(56) References Cited

U.S. PATENT DOCUMENTS

| | | | | | |
|---|---|---|---|---|---|
| 3,493,085 | A | * | 2/1970 | Libhart | ............... B60B 33/0078 |
| | | | | | 188/74 |
| 3,628,214 | A | * | 12/1971 | MacKay | ............... B60B 33/021 |
| | | | | | 16/35 R |
| 2019/0014718 | A1 | * | 1/2019 | Uemura | ................... B60K 1/04 |
| 2022/0340185 | A1 | | 10/2022 | Thomas | |

(Continued)

FOREIGN PATENT DOCUMENTS

| | | | | |
|---|---|---|---|---|
| JP | 2003212125 | A | * | 7/2003 |
| JP | 2006-89236 | A | | 4/2006 |
| JP | 2006089236 | A | * | 4/2006 |

(Continued)

OTHER PUBLICATIONS

Extended European Search Report dated Aug. 8, 2024, issued in counterpart application No. 23186365.5. (14 pages).

*Primary Examiner* — James A Shriver, II
(74) *Attorney, Agent, or Firm* — WHDA, LLP

(57) ABSTRACT

An external charger is to be easily transported and securely prevented from falling during transport. A wheeled platform for external charger for transporting an external charger supplying electric power to a working vehicle driven by an electric motor includes: a pedestal where the external charger is placed; and a caster and a support pillar attached to the pedestal. The pedestal or the support pillar is provided with an engagement part which a blade of the working vehicle can be engaged with. The engagement part is configured in such a way that a movement regulating member preventing the blade from wobbling can be attached in a state where the caster is spaced apart from a ground by lifting the blade further from a state where the blade is engaged.

8 Claims, 9 Drawing Sheets

V-Part

(56)         References Cited

U.S. PATENT DOCUMENTS

2024/0286661 A1* 8/2024 Matsumoto ............ B60L 53/57

FOREIGN PATENT DOCUMENTS

JP          6463537 B1    2/2019
WO          WO-9909806 A1 * 3/1999   .......... A01B 59/062

* cited by examiner

V-Part

FIG.10

WHEELED PLATFORM FOR EXTERNAL CHARGER AND METHOD FOR TRANSPORTING EXTERNAL CHARGER

CROSS-REFERENCE TO RELATED APPLICATION

This application is based upon and claims the benefit of priority of the prior Japanese Patent Application No. P2023-027877, filed on Feb. 27, 2023, and the entire contents of which are incorporated herein by reference.

TECHNICAL FIELD

The present invention relates to a wheeled platform for external charger for transporting an external charger that supplies electric power to a working vehicle driven by an electric motor, and a method for transporting an external charger.

BACKGROUND ART

According to the related art, as an example of the working vehicle, a hydraulic excavator, a track loader or the like having a lower body with crawlers or wheels for traveling attached thereto, an upper body arranged above the lower body, and a hydraulically actuated working unit attached to the lower body or the upper body, is known.

Recently, the working vehicle driven by an electric motor instead of a conventional engine has been developed (see PTL 1: JP6463537B). In some cases, an external charger provided outside the working vehicle, that supplies electric power to the working vehicle is used.

SUMMARY OF INVENTION

Technical Problem

When the working vehicle driven by the electric motor carries out work at a working site, in not a few circumstances, the working vehicle and the external charger must be connected together to supply electric power. However, since the working site in most cases has an unleveled soil ground, how the external charger, which is a heavy object, should be transported is a problem to solve.

Solution to Problem

The present invention has been made in view of the foregoing circumstances and aims to provide a wheeled platform for external charger and a method for transporting an external charger that can easily transport the external charger, which is a heavy object, even at a working site where the ground is not leveled, and that can securely prevent the external charger from falling during the transport.

The present invention has been accomplished under the solutions as described below.

A wheeled platform for external charger according to an embodiment is a wheeled platform for external charger for transporting an external charger that supplies electric power to a working vehicle driven by an electric motor. The wheeled platform for external charger includes: a pedestal where the external charger is placed; and a caster and a support pillar attached to the pedestal. The pedestal or the support pillar is provided with an engagement part which an upper end part of a blade of the working vehicle can be engaged with. The engagement part is configured in such a way that a movement regulating member preventing the blade from wobbling can be attached in a state where the caster is spaced apart from a ground by lifting the blade further from a state where the upper end part is engaged. According to one embodiment, the engagement part is formed in a U-shape opening downward as viewed from a lateral side, and is configured in such a way that an inner surface on a rear side abuts on a rear surface of the blade and an inner surface on a front side does not abut on a front surface of the blade and forms a space part having a predetermined dimension, in a state where the caster is spaced apart from the ground by lifting the blade further from a state where the upper end part is made to enter and abut on a position corresponding to a bottom part of an opening, and is configured in such a way that the movement regulating member regulating the front surface of the blade from moving in a direction of abutting on the inner surface on the front side inside the space part can be attached.

According to the above configuration, the wheeled platform for external charger in the state where the external charger is placed can be lifted up by the blade of the working vehicle. Also, this wheeled platform for external charger can be transported by causing the working vehicle to travel in that state. Therefore, the external charger, which is a heavy object, can be easily transported. Meanwhile, if the working vehicle travels on an unleveled ground, the working vehicle and hence the blade shake in up and down directions and an inconvenience of the wheeled platform for external charger coming off and falling from the blade during the transport tends to occur. To cope with this, the engagement part of the wheeled platform for external charger for engaging the blade is provided with the movement regulating member regulating the movement of the blade inside the space part of the engagement part. Therefore, the falling of the external charger during the transport can be securely prevented.

Also, it is preferable to employ a configuration where a U-shaped member is used as the movement regulating member. Particularly, it is preferable to employ a configuration where a wheel stopper that is U-shaped and is held in such a way as to be able to be accommodated in and taken out from a holder provided in the wheeled platform for external charger and is configured to be able to be engaged with and released from the caster, and that is engaged with the caster and thus stops the caster from rotating, is also used as the movement regulating member. According to this configuration, the wheel stopper for preventing the wheeled platform for external charger from rolling can be used as the movement regulating member for the blade. Therefore, the movement regulating member need not be separately produced and prepared as a dedicated member and a cost reduction can thus be achieved. Also, since the wheel stopper is provided on the wheeled platform for external charger, there is no risk of forgetting to bring the wheel stopper into the working site and the use of the wheel stopper can be made sure.

The engagement part may be configured in such a way that a front end part of a grounding part of a bucket of the working vehicle can enter, instead of the upper end part of the blade or in addition to the upper end part of the blade.

Also, a method for transporting an external charger according to an embodiment is a method for transporting an external charger that supplies electric power to a working vehicle driven by an electric motor. The method includes: a placing step of placing the external charger on a wheeled platform for external charger; a lifting step of, from a state where an upper end part of a blade of the working vehicle is engaged with an engagement part provided in the wheeled platform for external charger, lifting the blade further and thus creating a state where a caster of the wheeled platform for external charger is spaced apart from a ground; an attachment step of attaching a movement regulating member preventing the blade from wobbling, to the engagement part; and a transport step of causing the working vehicle having the blade to travel and thus transporting the external charger. According to one embodiment, the lifting step includes a step of lifting the blade further from a state where the upper end part of the blade is made to enter the engagement part having a U-shape opening downward as viewed from a lateral side provided in the wheeled platform for external charger, and to abut on a position corresponding to a bottom part of an opening, and thus creating the state where the caster of the wheeled platform for external charger is spaced apart from the ground. The attachment step includes a step of creating a state where an inner surface on a rear side of the engagement part abuts on a rear surface of the blade and where an inner surface on a front side of the engagement part does not abut on a front surface of the blade and forms a space part having a predetermined dimension, and attaching, to the engagement part, the movement regulating member regulating the front surface of the blade from moving in a direction of abutting on the inner surface on the front side inside the space part.

Also, it is preferable to employ a configuration where a wheel stopper preventing the caster from rotating is also used as the movement regulating member.

Advantageous Effects of Invention

According to the present invention, an external charger used to supply electric power to a working vehicle driven by an electric motor can be easily transported even at a working site where the ground is not leveled. Also, the external charger can be securely prevented from falling during the transport.

BRIEF DESCRIPTION OF DRAWINGS

FIG. 4A is a side view of a state before an upper end part of a blade is made to enter an engagement part. FIG. 4B is a side view of a state where the upper end part of the blade is made to enter the engagement part and abut on a position corresponding to a bottom part of an opening. FIG. 4C is a side view of a state where the blade is lifted further, thus spacing a caster apart from the ground. FIG. 4D is a side view of a state where a movement regulating member is attached to the engagement part.

FIG. 10 is a perspective view showing another example of the working vehicle transporting the wheeled platform for external charger.

DESCRIPTION OF EMBODIMENTS

Figure 1:
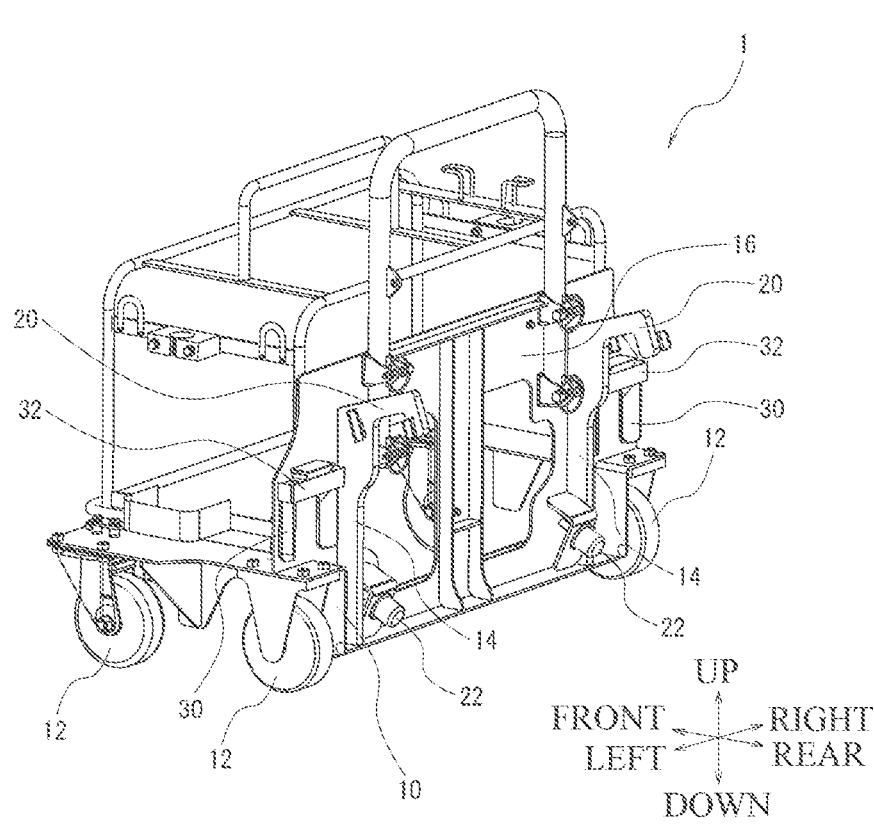
FIG. 1 is a perspective view showing an example of a wheeled platform for external charger according to an embodiment of the present invention.

An embodiment of the present invention will now be described in detail with reference to the drawings. FIG. 1 is a schematic view (perspective view from above the left rear) showing an example of a wheeled platform for external charger 1 according to this embodiment. For the sake of convenience of description, up and down, left and right, and front and rear directions may be indicated by arrows in the drawings. Also, in all the drawings for explaining the embodiment, members having the same function are denoted by the same reference sign and the description of the members may not be repeated.

The present invention relates to the wheeled platform for external charger 1 used when transporting an external charger 2 provided outside a working vehicle 1, that supplies the working vehicle 101 driven by an electric motor, with electric power for driving the electric motor, and a method for transporting the wheeled platform for external charger 1.

First, an example of the configuration of the working vehicle 101 driven by the electric motor will be described. A hydraulic excavator (see FIG. 9) is employed as an example of the working vehicle 101. However, the working vehicle 101 is not limited to the hydraulic excavator.

Figure 9:
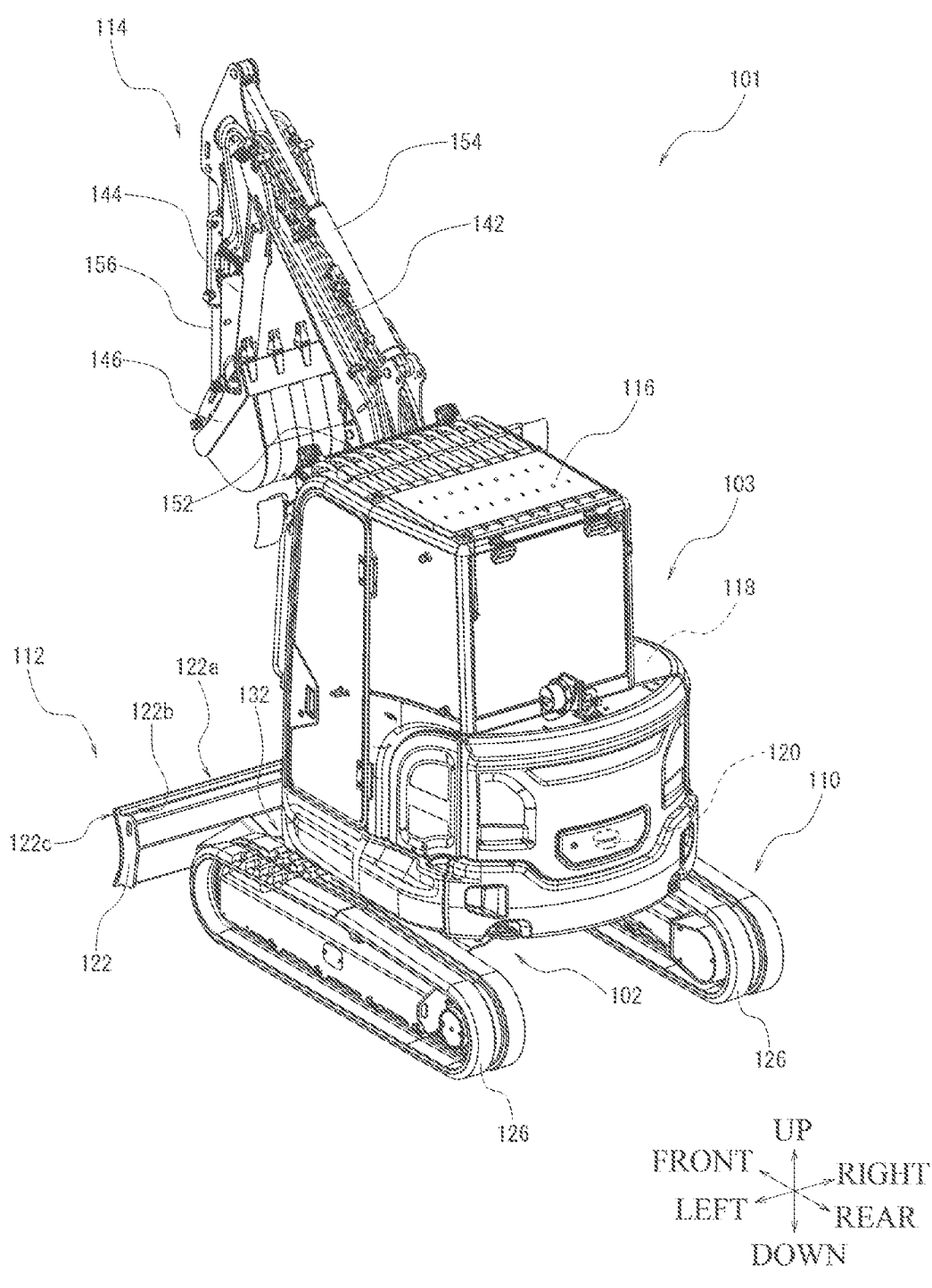
FIG. 9 is a perspective view showing an example of a working vehicle driven by an electric motor and transporting the wheeled platform for external charger.

As shown in FIG. 9, the working vehicle 101 has a lower body 102 with a travel unit 110 attached thereto. The working vehicle 101 has an upper body 103 arranged above the lower body 102 (though the lower body 102 and the upper body 103 may be configured to be unified together). The working vehicle 101 has working units 112, 114 that are attached to the lower body 102 and the upper body 103 and hydraulically actuated (by a hydraulic oil with a predetermined pressure).

The upper body 103 has a cab 116 provided with an operating unit at a front part thereof on which an operator getting in the vehicle carries out an operation such as traveling or working.

As an example of the travel unit 110, a pair of left and right crawlers (tracks) 126 are provided. However, the travel unit 110 is not limited to the crawlers 126. In another example, the travel unit 110 may be configured to have wheels (not illustrated) instead of the crawlers 126. The crawlers 126 are driven (made to travel) by a hydraulic motor for traveling (not illustrated).

As an example of the working unit 112, a blade 122 is provided. The blade 122 is attached to the lower body 102 in such a way as to be able to swing upward and downward (including forward and backward components). The blade 122 is driven by a hydraulic cylinder (blade cylinder) 132. However, the working unit 112 is not limited to the above configuration.

As an example of the working unit 114, a boom 142, an arm 144, and an attachment (in this embodiment, a bucket) 146 are provided. However, the attachment 146 is not limited to the bucket. The boom 142 is attached to the upper body 103 in such a way as to be able to swing upward and downward (including forward and backward components). In this embodiment, a boom bracket (not illustrated) is provided between the upper body 103 and the boom 142. The boom bracket enables the boom 142 to swing to the left and right (including forward and backward components) in relation to the upper body 103. The boom bracket may be omitted. The arm 144 is attached to the boom 142 in such a way as to be able to swing upward and downward (including forward and backward components). The attachment 146 is attached to the arm 144 in such a way as to be able to swing upward and downward (including forward and backward components). The boom 142 is driven by a hydraulic cylinder (boom cylinder) 152. The arm 144 is driven by a hydraulic cylinder (arm cylinder) 154. The attachment 146 is driven by a hydraulic cylinder (bucket cylinder) 156. However, the working unit 114 is not limited to the above configuration.

In an example, a drive mechanism for driving the above hydraulic motor for traveling and each of the hydraulic cylinders is formed of a hydraulic pump, a control valve and the like driven by a drive source 118. As the operator operates the operating unit to actuate the control valve, a control to supply a hydraulic oil with a predetermined pressure sent out from the hydraulic pump, to the hydraulic motor for traveling and each of the hydraulic cylinders, is performed. Thus, the traveling by the travel unit 110 and the work by the working units 112, 114 can be performed. As for the hydraulic pump forming the drive mechanism, one or a plurality of such hydraulic pumps are provided according to the configuration and the load or the like of the working unit and the travel unit.

In this embodiment, the working vehicle 101 has an electric motor as the above drive source 118. As for the electric motor forming the drive source 118, one or a plurality of such electric motors are provided according to the number of the above hydraulic pumps and the rated output thereof or the like. As another example of the drive source 118, a configuration using a combination of an engine and the electric motor may be employed (not illustrated).

The working vehicle 101 also has a rechargeable battery that supplies electric power to the drive source (the electric motor) 118, a conversion unit such as an inverter, and a control unit or the like (not illustrated). For the supply of electric power to this rechargeable battery, a method of connecting together an external power supply (single-phase AC power supply, three-phase AC power supply or the like) and the external charger 2 and also connecting an output cable from the external charger 2 to an inlet 120 provided in the upper body 103, thus supplying electric power, is employed. As another example of the method for supplying electric power to the rechargeable battery, a configuration using a combination of the above method and a method of supplying electric power via an in-vehicle charger (an on-board charger) installed in the upper body 103 may be employed (not illustrated).

The other mechanisms for the traveling and the work in the working vehicle 101 according to this embodiment are similar to those in a known working vehicle (hydraulic excavator) and therefore a detailed description thereof is omitted.

Figure 2:
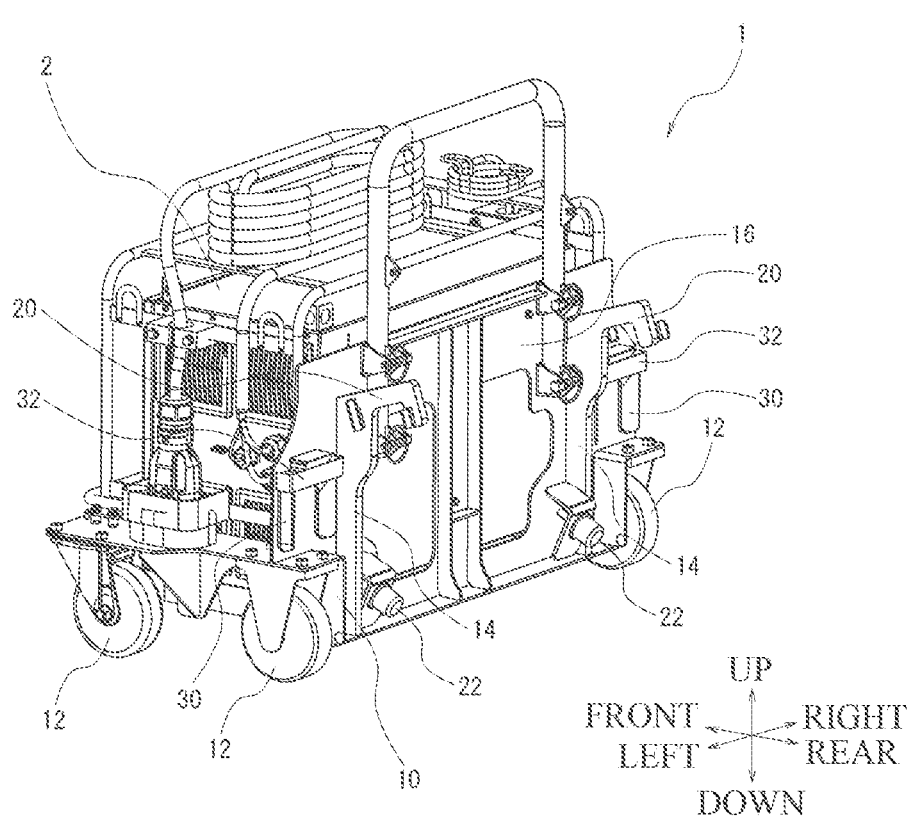
FIG. 2 is a perspective view showing an example of a state where an external charger is placed on the wheeled platform for external charger shown in FIG. 1.
Figure 3:
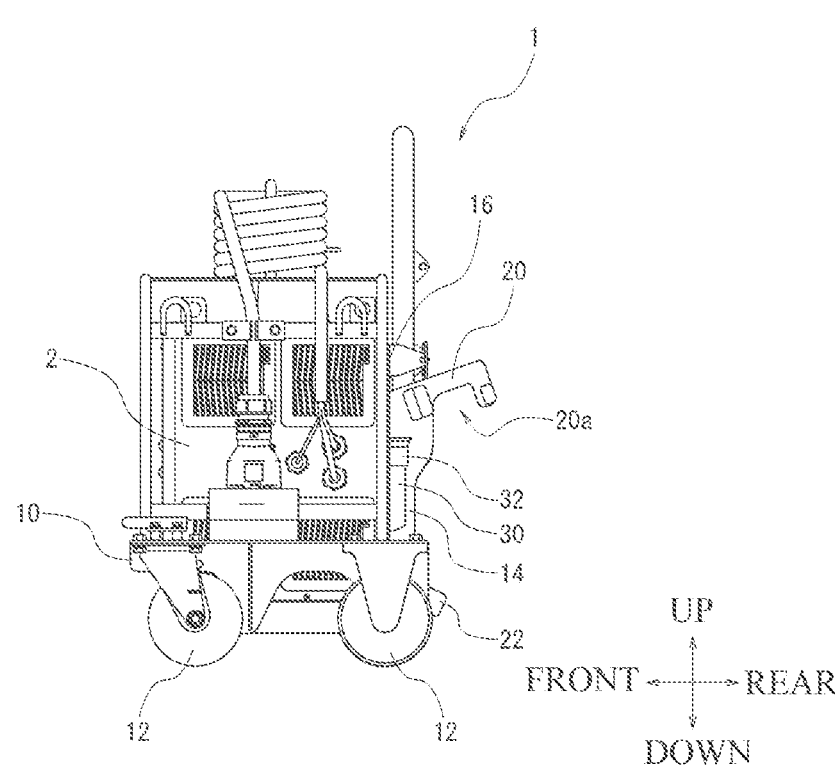
FIG. 3 is a side view showing an example of the wheeled platform for external charger shown in FIG. 2.

The wheeled platform for external charger 1 transporting the external charger 2 will now be described in detail. FIG. 1 is a perspective view of the wheeled platform for external charger 1. FIG. 2 is a perspective view showing an example of a state where the external charger 2 is placed on the wheeled platform for external charger 1. FIG. 3 is a side view thereof.

The wheeled platform for external charger 1 has a pedestal 10 where the external charger 2 is placed. The wheeled platform for external charger 1 also has casters 12 formed of four wheels that are attached to the four corners of the pedestal 10 and rotate. The wheeled platform for external charger 1 also has two support pillars 14 provided upright as a left-right pair at a rear part of the pedestal 10. The wheeled platform for external charger 1 also has a fixing part 16 that fixes (in an example, fastens with a bolt) the external charger 2 to the rear part of the pedestal 10. In an example, the fixing part 16 uses a plate-like member and is coupled (welded) to the support pillars 14 but is not limited to this configuration.

The support pillars 14 (or the pedestal 10) are each provided with an engagement part 20 having a shape which an upper end part of a blade of a "working vehicle" can enter and be engaged with. However, the "working vehicle" in this case refers to a "working vehicle for transport" used to transport the wheeled platform for external charger 1 and is therefore not limited to the "working vehicle driven by the electric motor" connected to the external charger 2 and receiving the supply of electric power. That is, a "working vehicle driven by an engine (gasoline, diesel or the like)" may be used. In this embodiment, the working vehicle 101 having the blade 122 is employed as an example for the description.

In an example, the engagement part 20 is formed in a U-shape (including a structure having a U-shaped portion at a part, such as a J-shape) opening downward as viewed from the lateral side (see FIG. 3). In this embodiment, a pair of left and right engagement parts, that is, two engagement parts, are provided, but this is not limiting. As another example of the engagement part, a configuration where one engagement part continuing to a predetermined length in a left-right direction is provided, or a configuration where three engagement parts are provided, or the like, may be employed (not illustrated).

The engagement part 20 is configured to allow the upper end part of the blade (an example of which is given as the blade 122 of the working vehicle 101) enter and be engaged with the engagement part 20, and to lift the blade 122 further, thus enabling the wheeled platform for external charger 1 to be lifted up.

Now, referring to FIG. 4, an operation of lifting up and transporting the wheeled platform for external charger 1 by the blade 122 of the working vehicle 101 (that is, the "method for transporting the wheeled platform for external charger" according to this embodiment) will be described. First, the external charger 2 is placed on the wheeled platform for external charger 1 (in this application, this may be referred to as a "placing step").

Figures 4A, 4B, 4C, 4D:
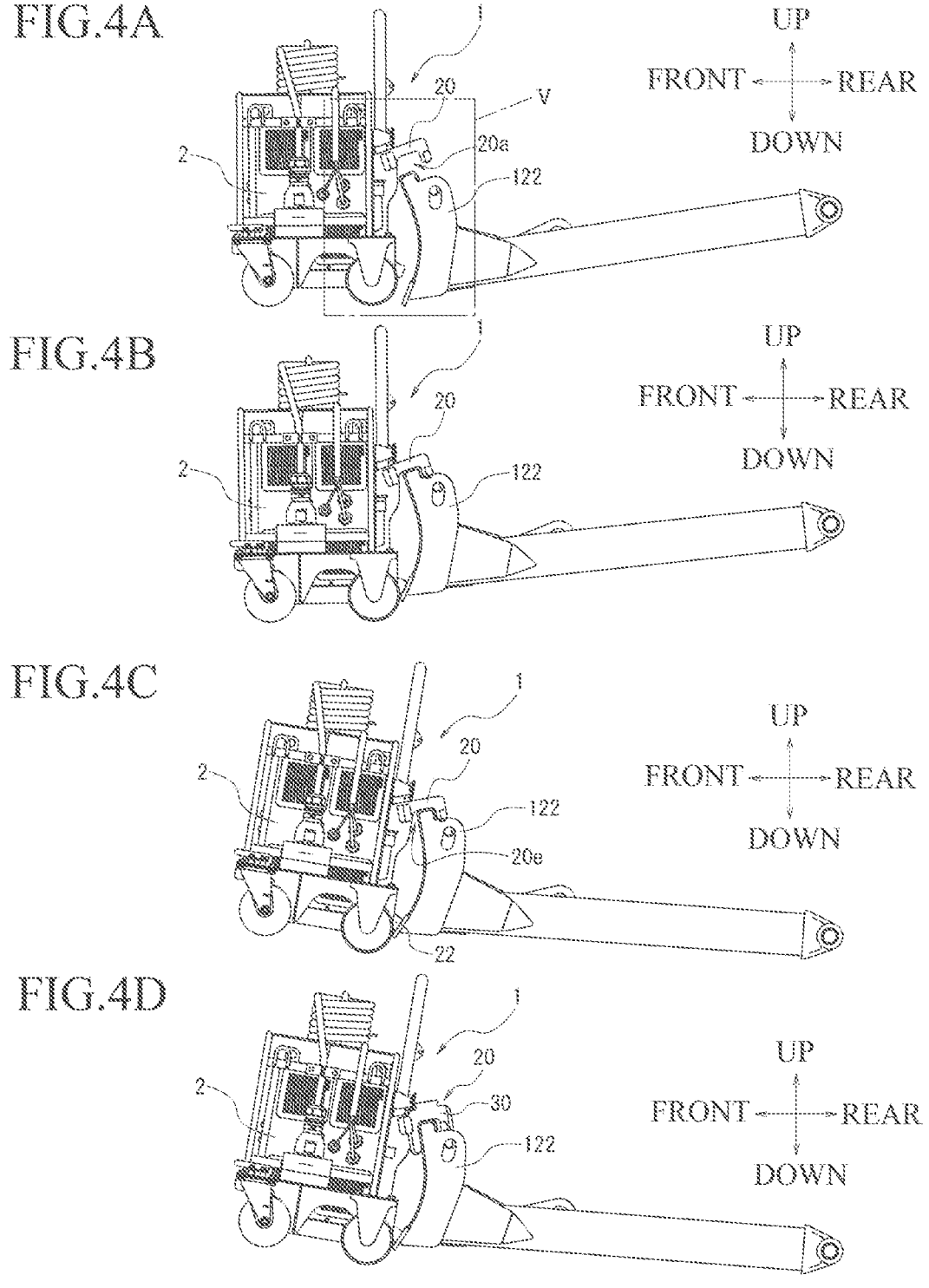
FIGS. 4A to 4D are explanatory views explaining a method for transporting the wheeled platform for external charger according to the embodiment of the present invention.
Figure 5:
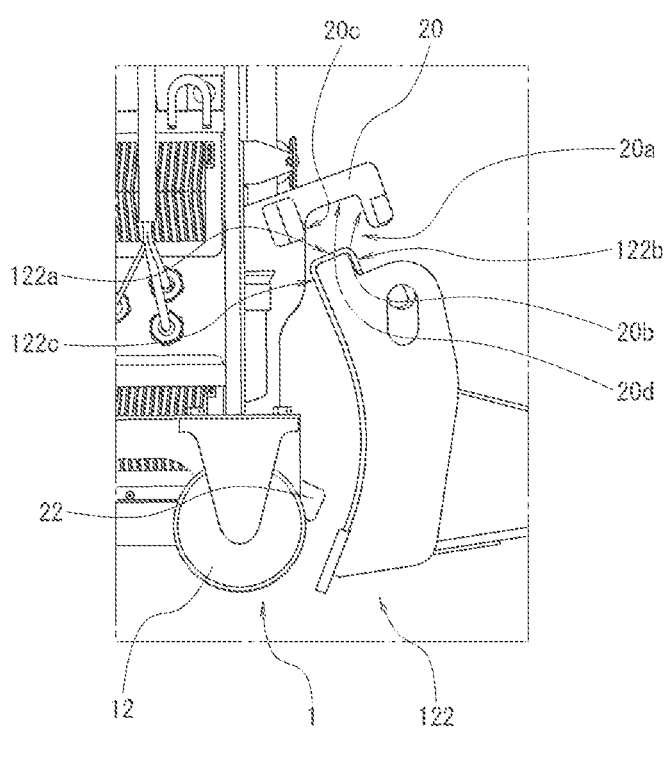
FIG. 5 is an enlarged view of a V-part in FIG. 4A.

Next, as shown in FIG. 4A, the blade 122 of the working vehicle 101 is brought closer to the wheeled platform for external charger 1 and is located below the engagement part 20. In this state, the blade 122 is lifted and made to enter the inside of an opening 20a of the engagement part 20 (FIG. 5 shows an enlarged view of a V-part in FIG. 4A). Then, as shown in FIG. 4B, the blade 122 is made to abut on a position corresponding to a bottom part 20d of the opening 20a. Then, as shown in FIG. 4C, the blade 122 is lifted further, creating a state where the casters 12 are spaced apart from the ground (in this application, this may be referred to as a "lifting step").

Next, the working vehicle 101 is made to travel while still in the state where the wheeled platform for external charger 1 is lifted up by the blade 122, and the wheeled platform for external charger 1 is thus transported (in this application, this may be referred to as a "transport step"). In this embodiment, as will described later, the transport is performed in a state where a movement regulating member 30 is attached. Thus, the external charger 2, which is a heavy object (in an example, approximately several tens to several hundreds of kg), can be easily transported.

Incidentally, the engagement part 20 is configured to be in a state described below in relation to the blade 122 when the wheeled platform for external charger 1 is lifted up by the blade 122 as shown in FIG. 4C. Specifically, an inner surface 20b on the rear side of the engagement part 20 is configured to abut on a rear surface 122b of the blade 122. An inner surface 20c on the front side of the engagement part 20 is configured to not abut on a front surface 122c of the blade 122 and to form a space part 20e having a predetermined dimension (in an example, approximately several tens of mm as viewed from the lateral side) in a front-and-rear direction.

A support part 22 made of a resin (including an elastomer) that abuts on a lower part of the front surface 122c of the blade 122 when the wheeled platform for external charger 1 is lifted up by the blade 122 is provided at a rear and lower part of the wheeled platform for external charger 1 (in an example, each support pillar 14) (the above abutment is caused by an action of gravity acting on the center of gravity of the wheeled platform for external charger 1). Thus, the lifting and supporting of the wheeled platform for external charger 1 by the blade 122 can be stabilized.

Figure 6:
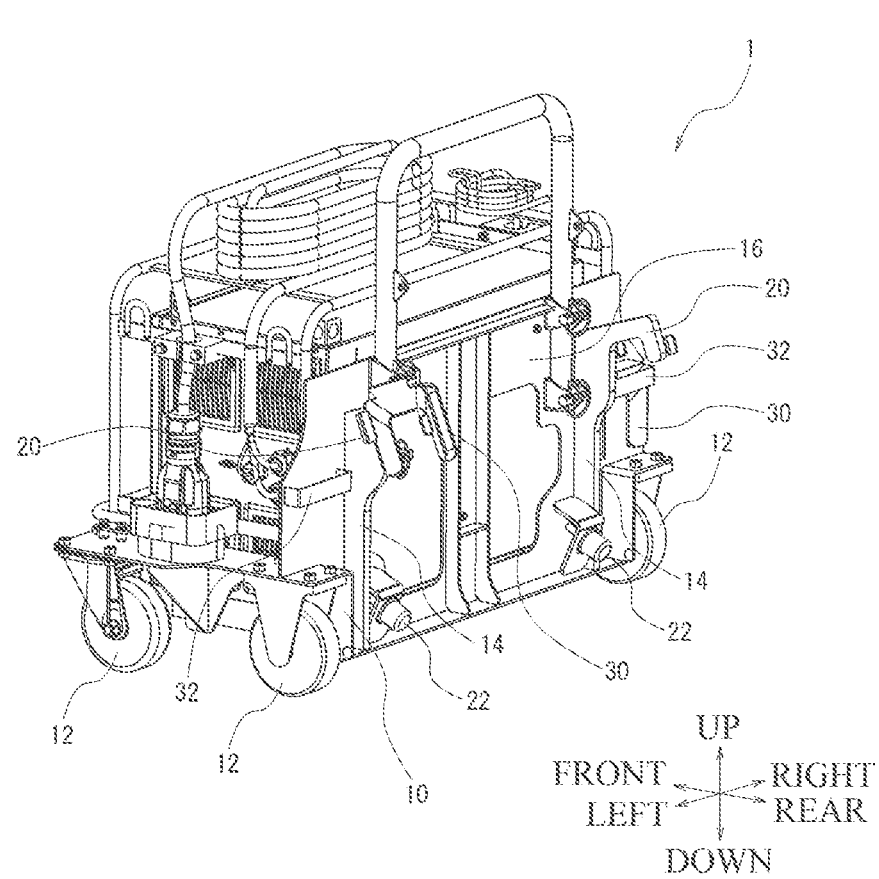
FIG. 6 is a perspective view of a state where the movement regulating member is attached to the engagement part of the wheeled platform for external charger shown in FIG. 2.

In this embodiment, after the state shown in FIG. 4C is created, the movement regulating member 30 is attached to the engagement part 20 and thus regulates the front surface 122c of the blade 122 from moving in the direction of abutting on the inner surface 20c on the front side of the engagement part 20, as shown in FIG. 4D (in this application, this may be referred to as an "attachment step"). This can achieve an effect of preventing the blade 122 from wobbling inside the space part 20e during the transport. To facilitate the understanding of the structure, FIG. 6 shows a perspective view of a state where the movement regulating member 30 (in an example, the one on the left side) is taken out of a holder 32 and attached to the engagement part 20.

As described above, if the working vehicle travels to transport the wheeled platform for external charger 1 on an unleveled ground, the blade of the working vehicle (an example of which is given as the blade 122) shakes in up and down directions and the inconvenience of the wheeled platform for external charger 1 coming off and falling from the blade 122 during the transport tends to occur. To cope with this, the movement regulating member 30 is attached to the engagement part 20 with which the blade 122 is engaged, and the movement of the blade 122 can thus be regulated inside the space part 20e (the space part generated in the state where the blade 122 has entered the inside of the opening 20a) of the engagement part 20. Thus, the external charger 2 can be securely prevented from wobbling and falling while being engaged with the blade 122 and thus transported.

In an example, the movement regulating member 30 has a configuration using a member formed of a metal material or a resin material and having a U-shape (including a structure having a U-shaped portion at a part, such as a J-shape).

Figure 7:
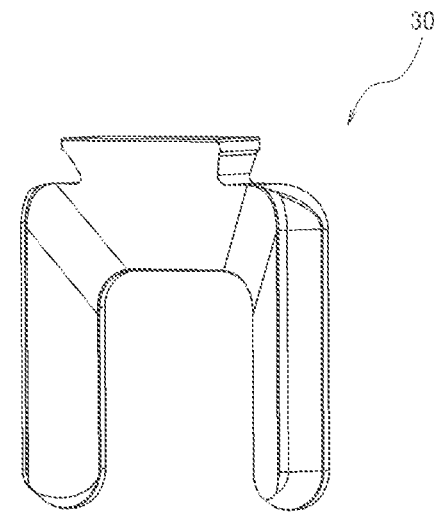
FIG. 7 is a perspective view showing an example of a wheel stopper that is also used as the movement regulating member of the wheeled platform for external charger shown in FIG. 1.

The movement regulating member 30 according to this embodiment is configured in such a way that a wheel stopper U-shaped as shown in FIG. 7 and configured in such

Figure 8:
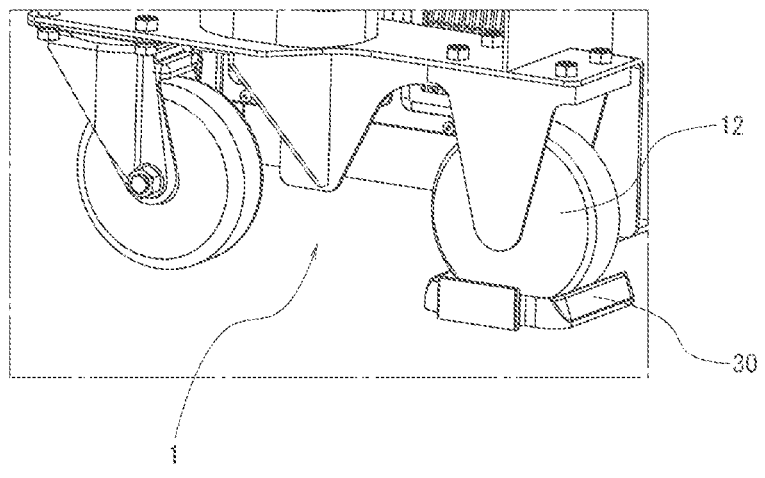
FIG. 8 is a perspective view of a state where the wheel stopper shown in FIG. 7 is engaged with the caster.

8 a way as to be able to be engaged with and released from the caster 12 is also used as the movement regulating member 30. As shown in FIG. 8, the wheel stopper 30 is formed in a shape that can be engaged with and released from the caster 12, spaced apart from the caster 12 via a predetermined gap (approximately several mm to several cm) at a position in both forward and backward directions by a method of placing on and releasing from the ground. The wheel stopper 30 becomes engaged with the caster 12 and thus can prevent unintended rotation of the caster 12 (that is, the rolling of the wheeled platform for external charger 1). The wheel stopper 30 is held in the holder 32 provided on the wheeled platform for external charger 1 in such a way as to be able to be accommodated in and taken out of the holder 32. In this embodiment, a configuration having two wheel stoppers 30 is employed. However, a configuration having one wheel stopper 30 may be employed.

According to the above configuration, the wheel stopper for preventing the wheeled platform for external charger 1 from rolling can also be used as the movement regulating member 30 for the blade 122. Thus, since the movement regulating member need not be separately produced and prepared as a dedicated member, a cost reduction can be achieved. Also, since the wheel stopper 30 is provided on the wheeled platform for external charger 1, there is no risk of forgetting to bring the wheel stopper 30 into the working site and the use of the wheel stopper 30 can be made sure.

Figure 10:
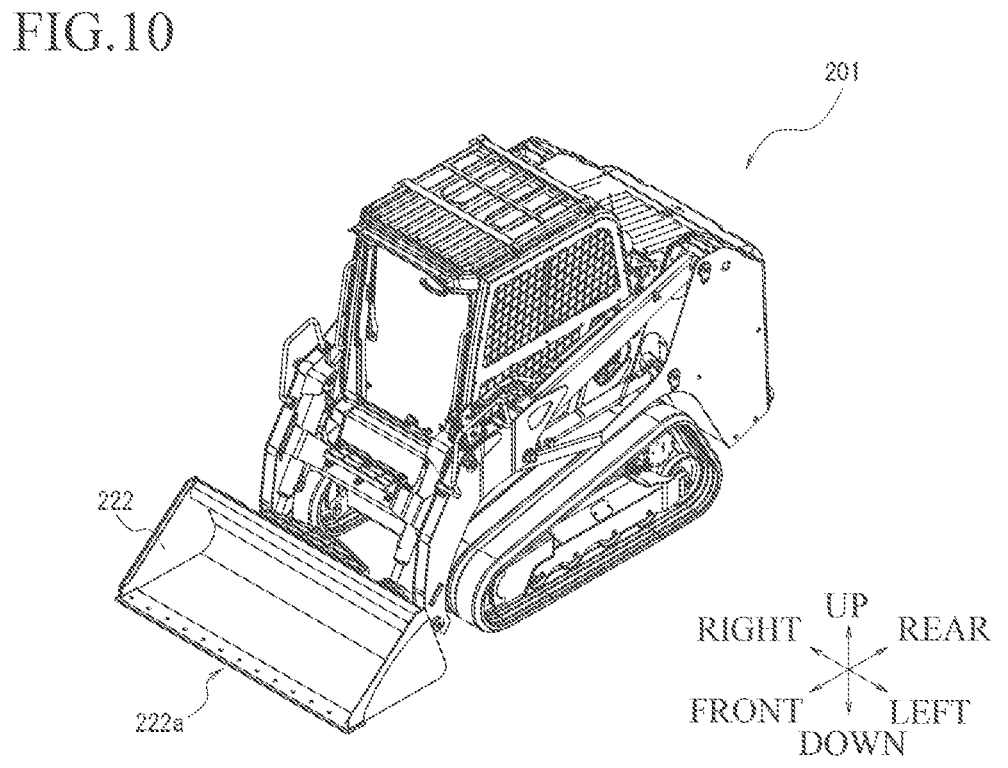

In the above embodiment, the configuration where the blade 122 of the working vehicle (hydraulic excavator) 101 shown in FIG. 9 is engaged with the engagement part 20 of the wheeled platform for external charger 1, thus lifting up and transporting the wheeled platform for external charger 1, is described as an example. However, this configuration is not limiting. As another example, a configuration where a front end part 222a of a grounding part of a bucket 222 of a working vehicle (track loader) 201 shown in FIG. 10 is put in an upward-facing state and is engaged with the engagement part 20 of the wheeled platform for external charger 1, thus lifting up and transporting the wheeled platform for external charger 1, may be employed. The bucket 222 is hydraulically driven.

As described above, with the wheeled platform for external charger 1 and the method for transporting the external charger 2 according to this embodiment, the external charger 2 used to supply electric power to the working vehicle 101 driven by the electric motor can be easily transported even at a working site where the ground is not leveled. Also, the external charger 2 can be securely prevented from falling during the transport.

While a hydraulic excavator is employed in the description as an example of the working vehicle 101 (the working vehicle driven by the electric motor) receiving the supply of electric power from the external charger 2, this is not limiting. The working vehicle 101 can also be applied to other working vehicles (for example, a track loader, a tracked dumper, and the like).

While the working vehicle 101 (the working vehicle driven by the electric motor) is employed in the description as an example of the working vehicle transporting the wheeled platform for external charger 1, this is not limiting. The working vehicle transporting the wheeled platform for external charger 1 can also be applied to other working vehicles (a working vehicle driven by an engine).

What is claimed is:

1. A wheeled platform for transporting an external charger that supplies electric power to a working vehicle driven by an electric motor, the wheeled platform for transporting external charger comprising:

a pedestal where the external charger is placed; and a caster and a support pillar attached to the pedestal, the pedestal or the support pillar being provided with an engagement part which an upper end part of a blade of the working vehicle can be engaged with, a movement regulating member preventing the blade from wobbling being configured in such a way as to be detachably attached to the engagement part in a state where the caster is spaced apart from a ground by lifting the blade further from a state where the upper end part of the blade is engaged.

2. The wheeled platform for external charger according to claim 1, wherein the engagement part is formed in a U-shape opening downward as viewed from a lateral side, and is configured in such a way that an inner surface on a rear side abuts on a rear surface of the blade and an inner surface on a front side does not abut on a front surface of the blade and forms a space part having a predetermined dimension, in a state where the caster is spaced apart from the ground by lifting the blade further from a state where the upper end part is made to enter and abut on a position corresponding to a bottom part of an opening, and is configured in such a way that the movement regulating member regulating the front surface of the blade from moving in a direction of abutting on the inner surface on the front side inside the space part can be attached.

3. The wheeled platform for external charger according to claim 1, wherein a U-shaped member is used as the movement regulating member.

4. The wheeled platform for external charger according to claim 2, wherein a U-shaped member is used as the movement regulating member.

5. The wheeled platform for external charger according to claim 1, wherein a wheel stopper that is U-shaped and is held in such a way as to be able to be accommodated in and taken out from a holder provided in the wheeled platform for external charger and is configured to be able to be engaged with and released from the caster, and that is engaged with the caster and thus stops the caster from rotating, is also used as the movement regulating member.

6. The wheeled platform for external charger according to claim 2, wherein a wheel stopper that is U-shaped and is held in such a way as to be able to be accommodated in and taken out from a holder provided in the wheeled platform for external charger and is configured to be able to be engaged with and released from the caster, and that is engaged with the caster and thus stops the caster from rotating, is also used as the movement regulating member.

7. The wheeled platform for external charger according to claim 1, wherein the engagement part is configured in such a way that a front end part of a grounding part of a bucket of the working vehicle can enter, instead of the upper end part of the blade or in addition to the upper end part of the blade.

8. The wheeled platform for external charger according to claim 2, wherein the engagement part is configured in such a way that a front end part of a grounding part of a bucket of the working vehicle can enter, instead of the upper end part of the blade or in addition to the upper end part of the blade.

* * * * *